(12) United States Patent
Zhuang

(10) Patent No.: US 9,709,374 B2
(45) Date of Patent: Jul. 18, 2017

(54) POINTER TYPE ANGLE MEASURING DEVICE

(71) Applicant: ZHEJIANG RONGSHENG TOOL CO., LTD, Jinhua, Zhejiang (CN)

(72) Inventor: Chengrong Zhuang, Jinhua (CN)

(73) Assignee: ZHEJIANG RONGSHENG TOOL CO., LTD, Jinhua (CN)

( * ) Notice: Subject to any disclaimer, the term of this patent is extended or adjusted under 35 U.S.C. 154(b) by 168 days.

(21) Appl. No.: 14/797,167

(22) Filed: Jul. 12, 2015

(65) Prior Publication Data

US 2016/0334200 A1 Nov. 17, 2016

(30) Foreign Application Priority Data

May 14, 2015 (CN) .......................... 2015 1 0244595

(51) Int. Cl.
| | |
|---|---|
| *G01C 9/12* | (2006.01) |
| *G01C 9/32* | (2006.01) |
| *G01B 3/56* | (2006.01) |
| *G01D 13/02* | (2006.01) |
| *G01D 13/22* | (2006.01) |
| *G01D 13/28* | (2006.01) |

(52) U.S. Cl.
CPC .................. *G01B 3/56* (2013.01); *G01C 9/12* (2013.01); *G01C 9/32* (2013.01); *G01D 13/02* (2013.01); *G01D 13/22* (2013.01); *G01D 13/28* (2013.01)

(58) Field of Classification Search
CPC ................................... G01C 9/12; G01C 9/32
USPC ................. 33/348, 366.11, 366.24, 391, 397
See application file for complete search history.

(56) References Cited

U.S. PATENT DOCUMENTS

| | | | | | |
|---|---|---|---|---|---|
| 500,452 | A | * | 6/1893 | Worrell ..................... | G01C 9/12 33/400 |
| 567,347 | A | * | 9/1896 | Kelly ........................ | G01C 9/12 33/402 |
| 679,506 | A | * | 7/1901 | Krabill ..................... | G01C 9/12 33/399 |
| 955,799 | A | * | 4/1910 | Holbrook ................. | G01C 9/12 33/351 |

(Continued)

FOREIGN PATENT DOCUMENTS

| | | |
|---|---|---|
| CN | 2211061 Y | 10/1995 |
| CN | 104236514 A | 12/2014 |

OTHER PUBLICATIONS

1st Office Action of counterpart Chinese Patent Application No. 201510244595.X issued on Oct. 11, 2016.

*Primary Examiner* — Christopher Fulton

(57) ABSTRACT

The invention discloses a pointer type angle measuring device, comprising a shell consisting of a front cover and a rear cover, windows respectively arranged on the front cover and the rear cover, respectively; a front transparent cover and a rear transparent cover respectively arranged on the windows of the front cover and the rear cover; a pointer, arranged within an inner cavity of the shell inside the front transparent cover and the rear transparent cover; a dial of circular shape, fixed at the outer edge of the windows on the shell. The double-sided readout pointer type angle measuring device with lighting of the invention is convenient to be used in measurement and correction of horizontal and vertical angles of objects when it is inconvenient to be read from single side.

7 Claims, 4 Drawing Sheets

(56) References Cited

U.S. PATENT DOCUMENTS

| | | | | | |
|---|---|---|---|---|---|
| 1,288,579 | A | * | 12/1918 | Hawley | G01C 9/14 33/397 |
| 1,618,262 | A | * | 2/1927 | Barger | G01C 9/12 33/391 |
| 2,175,751 | A | * | 10/1939 | Fairchild | G01C 9/12 33/354 |
| 2,595,109 | A | * | 4/1952 | Steady | G01C 9/00 33/351 |
| 2,704,405 | A | * | 3/1955 | Kupchak | G01C 9/12 116/DIG. 37 |
| 2,847,765 | A | * | 8/1958 | Bateman | G01C 9/12 33/391 |
| 3,079,697 | A | * | 3/1963 | Lunde | E21B 47/02232 33/366.24 |
| 3,204,233 | A | * | 8/1965 | Olliff | G01C 9/18 172/4.5 |
| 3,233,235 | A | * | 2/1966 | Wright | G01C 9/06 200/61.45 R |
| 3,800,426 | A | * | 4/1974 | Nakamura | G01C 9/12 33/368 |
| 4,003,134 | A | * | 1/1977 | Adams | G01C 9/06 33/348 |
| 4,843,725 | A | * | 7/1989 | Harris | G01C 9/12 33/391 |
| 6,158,135 | A | * | 12/2000 | Rank | B43L 7/00 33/1 B |
| 7,392,593 | B2 | * | 7/2008 | Rivers | E06C 7/003 182/18 |
| 7,594,286 | B2 | * | 9/2009 | Williams | G01C 9/06 33/348 |
| 7,743,520 | B1 | * | 6/2010 | Jiorle | G01C 9/06 33/366.11 |
| 2014/0101950 | A1 | * | 4/2014 | Zhuang | G01C 9/32 33/348.2 |

* cited by examiner

POINTER TYPE ANGLE MEASURING DEVICE

CROSS-REFERENCE TO RELATED APPLICATIONS

This present application claims the benefit of Chinese Patent Application No. 201510244595.X filed on May 14, 2015, the contents of which are hereby incorporated by reference.

FIELD OF THE INVENTION

The invention relates to a double-sided readout pointer type angle measuring device used for measurement and correction of horizontal, vertical and 45° angles of objects.

BACKGROUND

Currently, measurement and correction of horizontal and vertical angles of objects are often needed during house decoration and maintenance, installation of articles, etc, the pointers of existing pointer type angle measuring devices can only be read from single side, causing inconvenience to measurement and correction of horizontal and vertical angles of objects. In addition, it is extremely inconvenient to measure and read objects in dark environment.

SUMMARY OF THE INVENTION

The purpose of the invention is to provide a double-sided readout pointer type angle measuring device with lighting so as to solve the problems that existing pointer type angle measuring devices are inconvenient to be read from single side and cannot measure and indicate angles in dark environment due to absence of double-sided readout and lighting functions, thus bringing convenience for measurement and correction of horizontal and vertical angles of objects when it is inconvenient to be read from one side and the environment is dark.

In order to achieve the purpose, the invention adopts the following technical scheme: a pointer type angle measuring device, comprising:

a shell, consisting of a front cover and a rear cover, windows respectively arranged on the front cover and the rear cover, and a front transparent cover and a rear transparent cover respectively arranged on the windows of the front cover and the rear cover;

a pointer, arranged within an inner cavity of the shell inside the front transparent cover and the rear transparent cover; and a dial of circular shape, fixed at the outer edge of the windows of the shell.

Further, the dial is arranged within the inner cavity of the shell inside the front transparent cover and the rear transparent cover.

Further, antiglare films are respectively attached on the front transparent cover and the rear transparent cover.

Further, the pointer consists of a pointer body, a front pointer head and a rear pointer head.

Further, the front pointer head and the rear pointer head are made of a transparent reflective material.

Further, the pointer body is of shell structure having an inner cavity; a level bubble is arranged in the inner cavity of the said pointer body, and level bubble windows are arranged in the front and rear of the pointer body.

Further, a through axle hole is arranged in the middle of the pointer body, a bearing is installed in the axle hole, a main shaft is installed in a bearing hole of the bearing, two ends of the main shaft are fixed to the front transparent cover and the rear transparent cover, and the said pointer can rotate around the main shaft as the axial line.

Further, an LED lighting unit is arranged within the inner cavity of the shell, and the LED lighting unit comprises a circular LED fixing ring arranged at inside edge of the dial, an LED light-emitting flexible circuit board is arranged on the LED fixing ring, and multiple LEDs are arranged on the LED light-emitting flexible circuit board.

Further, the LED light-emitting flexible circuit board comprises a microcomputer processor IC1, a power circuit, an alarm circuit, a charging protective circuit and an LED drive circuit; wherein:

the microcomputer processor IC1 is an HT46R064B microcomputer processor;

the power circuit comprises a capacitor C2, a capacitor C3, a parallel voltage stabilizing integrated circuit IC2, a resistor R4, a resistor R5 and a resistor R6; wherein, the capacitor C2 is an electrolytic capacitor, the cathode of the capacitor C2 is grounded and connected with pin 5 of the microcomputer processor IC1, one end of the capacitor C3, the anode of the parallel voltage stabilizing integrated circuit IC2, one end of the resistor R5 and one end of the resistor R6; the anode of the capacitor C2, pin 13 of the microcomputer processor IC1, pin 12 of the microcomputer processor IC1, the other end of the capacitor C3, the cathode of the parallel voltage stabilizing integrated circuit IC2, one end of the resistor R4 and one end of the resistor R6 are connected to the mains voltage VDD in the circuit; and the other end of the resistor R4, the other end of the resistor R5 and the reference electrode of the parallel voltage stabilizing integrated circuit IC2 are connected;

the alarm circuit comprises a buzzer BUZ, a resistor R9 and a triode Q2; wherein one end of the resistor R9 is connected with pin 15 of the microcomputer processor IC1, and the other end is connected with the base electrode of the triode Q2, pin 1 of the buzzer BUZ is connected with the mains voltage VDD, pin 2 of the buzzer BUZ is connected with the collector electrode of the triode Q2, and the emitter electrode of the triode Q2 is grounded;

the charging protective circuit comprises a power source E, a resistor R2, a resistor R3, a resistor R8, a resistor R24, a resistor R25 and a triode Q1; wherein, the cathode of the power source E is connected with one end of the resistor R24 and grounded, the anode of the power source E is connected with one end of the resistor R8, one end of the resistor R25, the emitter electrode of the triode Q1 and the mains voltage VDD; the other end of the resistor R24 is connected with the other end of the resistor R25 and pin 4 of the microcomputer process IC1, the other end of the resistor R8 is connected with one end of the resistor R3, the collector electrode of the triode Q1 and the mains voltage VCC, the other end of the resistor R3 is connected with the base electrode of the triode Q1 and one end of the resistor R2, and the other end of the resistor R2 is connected with pin 7 of the microcomputer process IC1;

the LED drive circuit comprises a triode Q3, resistors R10 to R23, and light emitting diodes LED1 to LED12; wherein, one end of resistors R14 to R23 is respectively connected with the cathodes of light emitting diodes LED3 to LED12, the other ends of the resistors R14 to R23 are connected and grounded, and the anodes of light emitting diodes LED3 to LED12 are connected with the collector electrode of the triode Q3, the emitter electrode of the triode Q3 is connected with one end of the resistor R12, the anode of the light emitting diode LED1, the anode of the light emitting diode LED2 and the mains voltage VDD, the base electrode of the triode Q3 is connected with the other end of the resistor R12 and one end of the resistor R13, the other end of the resistor R13 is connected with pin 11 of the microcomputer process IC1, the cathode of the light emitting diode LED1 is connected with one end of the resistor R10, the other end of the resistor R10 is connected with pin 16 of the microcomputer process IC1, the cathode of the light emitting diode LED2 is connected with one end of the resistor R11, and the other end of the resistor R11 is connected with pin 1 of the microcomputer process IC1.

Further, the LED light-emitting flexible circuit board comprises an energy-saving circuit, and the energy-saving circuit comprises a capacitor C1, a capacitor C4, a resistor R1, a resistor R11 and a starting switch SK; wherein, the capacitor C1 is an electrolytic capacitor, the anode of the capacitor C1 is connected with one end of the resistor R11 and the mains voltage VCC in the circuit, the cathode of the capacitor C1 is grounded and connected with the other end of the resistor R11, one end of the capacitor C4 and one end of the resistor R1; the other end of the capacitor C4 is connected with one end of the starting switch SK and pin 7 of the microcomputer processor IC1, and the other end of the starting switch SK is connected with the other end of the resistor R1.

The beneficial effects of the invention are as follows: compared with existing angle measuring devices, the pointer type angle measuring device of the invention can be read from the front side and the rear side at the same time, and the level bubble and the pointer can give out light. The double-sided readout pointer type angle measuring device of the invention can be used either independently or in combination with traditional measuring devices such as level bar. The double-sided readout pointer type angle measuring device with lighting of the invention is convenient to be used in measurement and correction of horizontal and vertical angles of objects when it is inconvenient to be read from single side, and convenient to be used for measurement and reading in dark environment.

BRIEF DESCRIPTION OF THE DRAWINGS

In FIG. 1 to FIG. 4,

Figure 1:
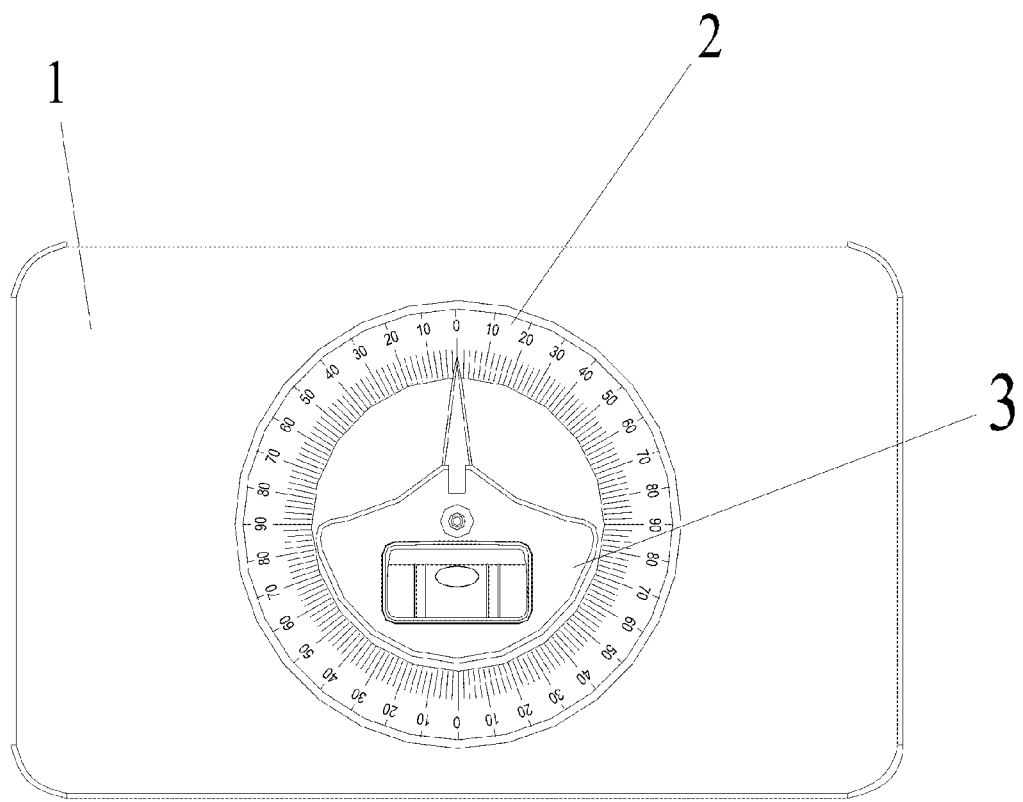
FIG. 1 is a schematic diagram of the appearance of the pointer type angle measuring device of the invention.
Figure 2:
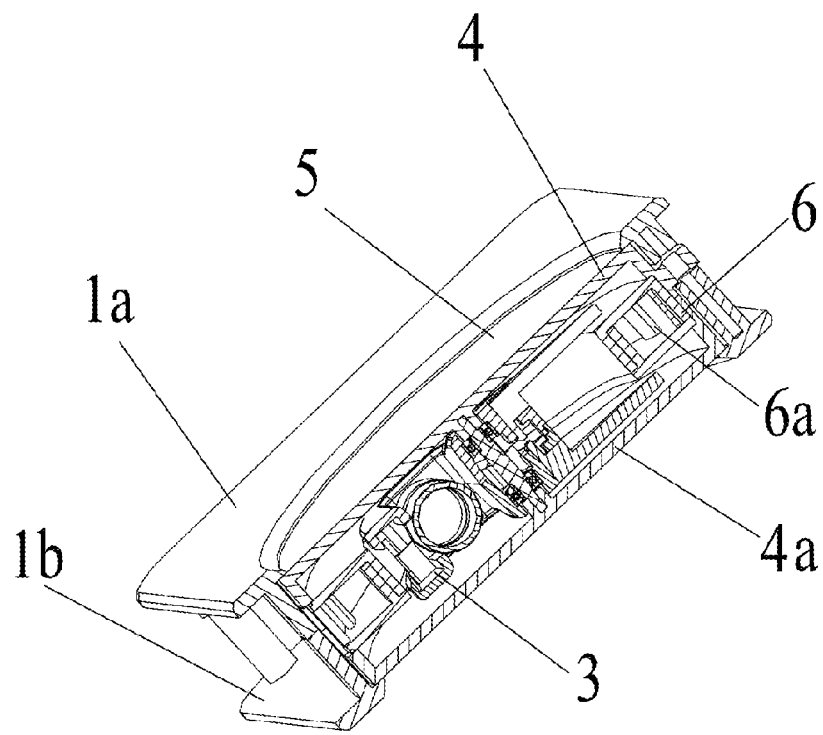
FIG. 2 is a structural diagram of the pointer type angle measuring device of the invention.
Figure 3:
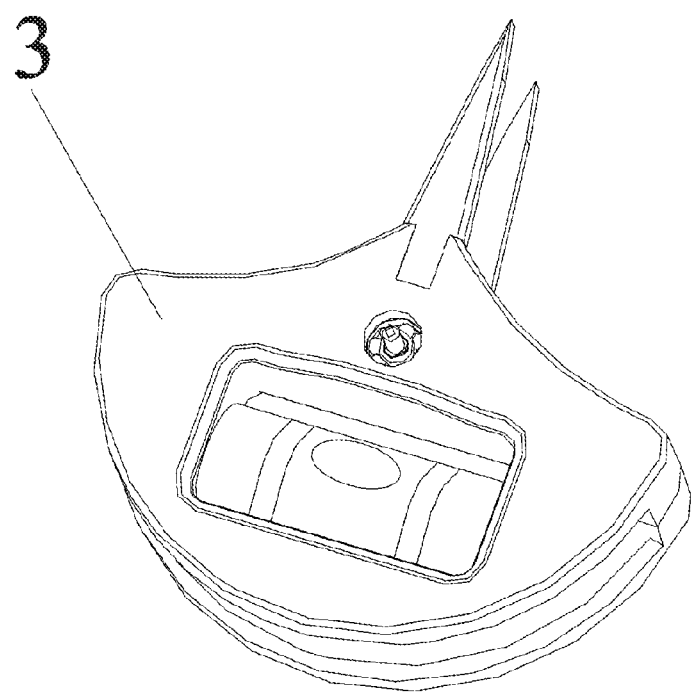
FIG. 3 is a schematic diagram of the appearance of the pointer of the invention.
Figure 4:
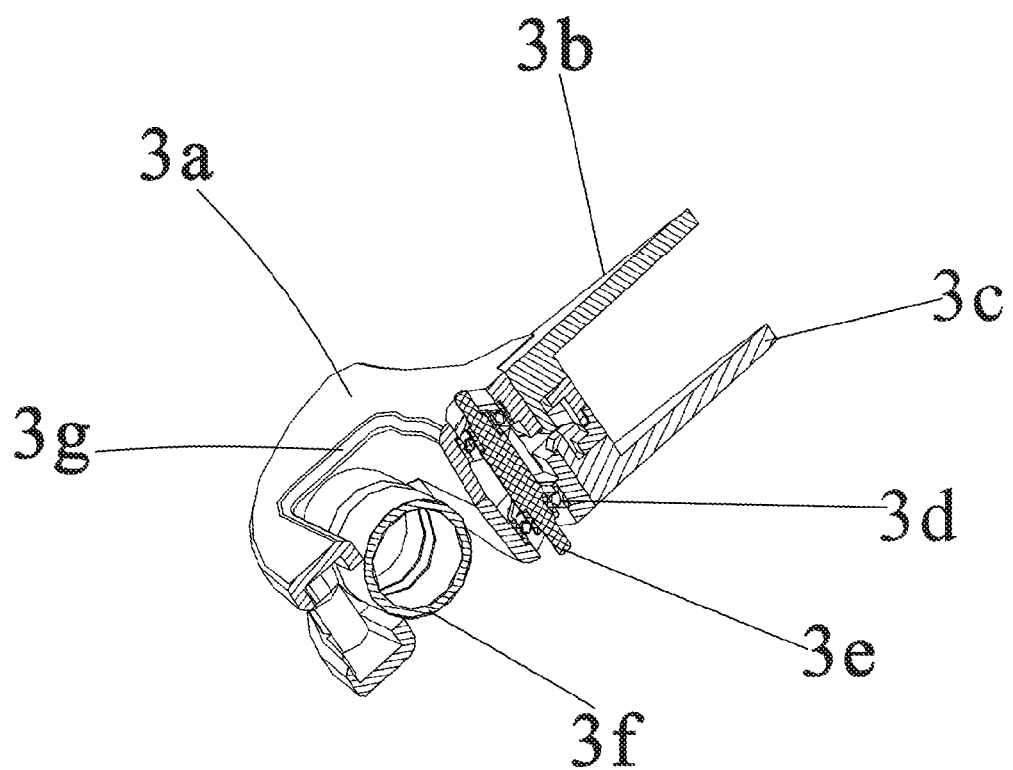
FIG. 4 is a structural diagram of the pointer of the invention.

1—shell; 1a—front cover; 1b—rear cover; 2—dial; 3—pointer; 3a—pointer body; 3b—front pointer head; 3c—rear pointer head; 3d—bearing; 3e—main shaft; 3f—level bubble 3g—level bubble window; 4—front transparent cover; 4a—rear transparent cover; 5—antiglare film; 6—LED lighting unit; 6a—LED fixing ring; 7—LED light-emitting flexible circuit board; 7a—power circuit; 7b—alarm circuit (7b); 7c—charging protective circuit; 7d—LED drive circuit; 7e—energy-saving circuit.

DESCRIPTION OF THE PREFERRED EMBODIMENT

As shown in FIG. 1 to FIG. 4, a pointer type angle measuring device of the invention, comprises:

a shell 1, consisting of a front cover 1a and a rear cover 1b, windows respectively arranged on the front cover 1a and the rear cover 1b, and a front transparent cover 4 and a rear transparent cover 4a respectively arranged on the windows of the front cover 1a and the said rear cover 1b;

a pointer 3, arranged within an inner cavity of the shell 1 inside the front transparent cover 4 and the rear transparent cover 4a;

a dial 2 of circular shape, fixed at the outer edge of the windows of the shell 1.

In the invention, the dial 2 is preferably arranged within the inner cavity of the shell inside the front transparent cover 4 and the rear transparent cover 4a.

In the invention, the pointer 3 consists of a pointer body 3a, a front pointer head (3b) and a rear pointer head 3c.

Wherein, the front pointer head 3b and the rear pointer head 3c are made of a transparent reflective material.

Wherein, the pointer body 3a is of shell structure having an inner cavity; a level bubble 3f is arranged in the inner cavity of the pointer body 3a, and level bubble windows 3g are arranged in the front and rear of the pointer body 3a.

Wherein, a through axle hole is arranged in the middle of the pointer body 3a, a bearing 3d is installed within the axle hole, a main shaft 3e is installed in a bearing hole of the bearing 3d, two ends of the main shaft 3e are fixed to the front transparent cover 4 and the rear transparent cover 4a, and the pointer 3 can rotate around the main shaft 3e as the axial line.

An LED lighting unit 6 is arranged within the inner cavity of the shell 1 of the invention, the LED lighting unit 6 comprises a circular LED fixing ring 6a arranged on the edge of the inside dial 2, an LED light-emitting flexible circuit board 7 is arranged on the LED fixing ring 6a, and multiple LEDs are arranged on the LED light-emitting flexible circuit board 7.

Figure 5:
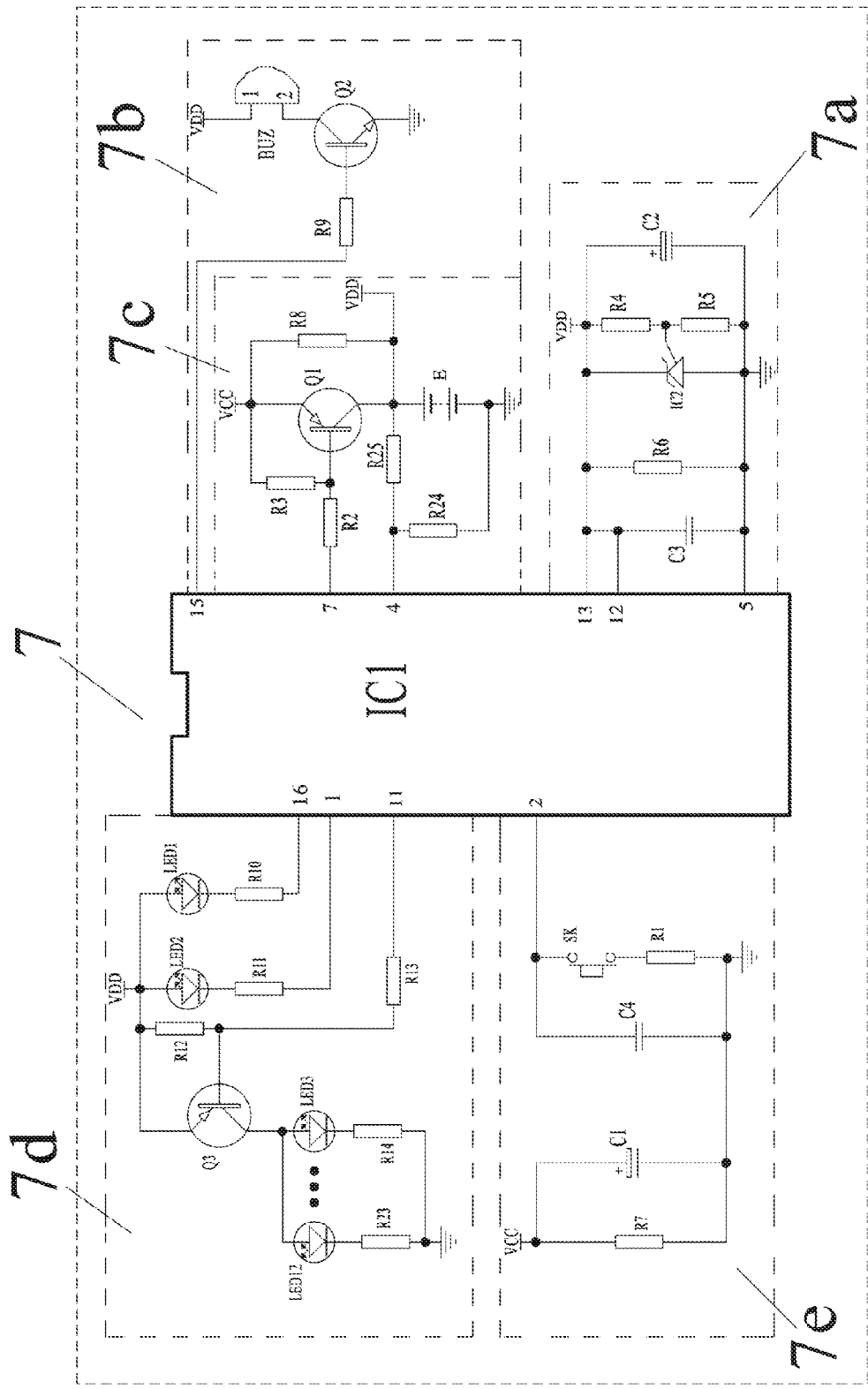
FIG. 5 is schematic circuit diagram of the LED light-emitting flexible circuit board of the invention.

As shown in FIG. 5, the LED light-emitting flexible circuit board 7 comprises a microcomputer processor IC1, a power circuit 7a, an alarm circuit 7b, a charging protective circuit 7c and an LED drive circuit 7d; wherein:

the microcomputer processor IC1 is an HT46R064B microcomputer processor;

the power circuit 7a comprises a capacitor C2, a capacitor C3, a parallel voltage stabilizing integrated circuit IC2, a resistor R4, a resistor R5 and a resistor R6; wherein, the capacitor C2 is an electrolytic capacitor, the cathode of the capacitor C2 is grounded and connected with pin 5 of the microcomputer processor IC1, one end of the capacitor C3, the anode of the parallel voltage stabilizing integrated circuit IC2, one end of the resistor R5 and one end of the resistor R6; the anode of the capacitor C2, pin 13 of the microcomputer processor IC1, pin 12 of the microcomputer processor IC1, the other end of the capacitor C3, the cathode of the parallel voltage stabilizing integrated circuit IC2, one end of the resistor R4 and one end of the resistor R6 are connected to the mains voltage VDD in the circuit; and the other end of the resistor R4, the other end of the resistor R5 and the reference electrode of the parallel voltage stabilizing integrated circuit IC2 are connected;

the alarm circuit 7b comprises a buzzer BUZ, a resistor R9 and a triode Q2; wherein, one end of the resistor R9 is connected with pin 15 of the microcomputer processor IC1, and the other end is connected with the base electrode of the triode Q2, pin 1 of the buzzer BUZ is connected with the mains voltage VDD, pin 2 of the buzzer BUZ is connected with the collector electrode of the triode Q2, and the emitter electrode of the triode Q2 is grounded; when the angle measuring device measures an angle, the microcomputer processor IC1 triggers PWM drive waveform, and through the resistor R9 to make triode Q2 drive the buzzer BUZ sound;

the charging protective circuit 7c comprises a power source E, a resistor R2, a resistor R3, a resistor R8, a resistor R24, a resistor R25 and a triode Q1; wherein, the cathode of the power source E is connected with one end of the resistor R24 and grounded, the anode of the power source E is connected with one end of the resistor R8, one end of the resistor R25, the emitter electrode of the triode Q1 and the mains voltage VDD; the other end of the resistor R24 is connected with the other end of the resistor R25 and pin 4 of the microcomputer process IC1, the other end of the resistor R8 is connected with one end of the resistor R3, the collector electrode of the triode Q1 and the mains voltage VCC, the other end of the resistor R3 is connected with the base electrode of the triode Q1 and one end of the resistor R2, and the other end of the resistor R2 is connected with pin 7 of the microcomputer process IC1;

the LED drive circuit 7d comprises a triode Q3, resistors R10 to R23, and light emitting diodes LED1 to LED12; wherein, one end of resistors R14 to R23 is respectively connected with the cathodes of light emitting diodes LED3 to LED12, the other ends of the resistors R14 to R23 are connected and grounded, and the anodes of light emitting diodes LED3 to LED12 are connected with the collector electrode of the triode Q3, the emitter electrode of the triode Q3 is connected with one end of the resistor R12, the anode of the light emitting diode LED1, the anode of the light emitting diode LED2 and the mains voltage VDD, the base electrode of the triode Q3 is connected with the other end of the resistor R12 and one end of the resistor R13, the other end of the resistor R13 is connected with pin 11 of the microcomputer process IC1, the cathode of the light emitting diode LED1 is connected with one end of the resistor R10, the other end of the resistor R10 is connected with pin 16 of the microcomputer process IC1, the cathode of the light emitting diode LED2 is connected with one end of the resistor R11, and the other end of the resistor R11 is connected with pin 1 of the microcomputer process IC1.

To realize automatic energy saving in operation, the LED light-emitting flexible circuit board 7 of the invention further comprises an energy-saving circuit 7e, the energy-saving circuit 7e comprising a capacitor C1, a capacitor C4, a resistor R1, a resistor R11 and a starting switch SK; wherein, the capacitor C1 is an electrolytic capacitor, the anode of the capacitor C1 is connected with one end of the resistor R11 and the mains voltage VCC in the circuit, the cathode of the capacitor C1 is grounded and connected with the other end of the resistor R11, one end of the capacitor C4 and one end of the resistor R1; the other end of the capacitor C4 is connected with one end of the starting switch SK and pin 7 of the microcomputer processor IC1, and the other end of the starting switch SK is connected with the other end of the resistor R1; when the starting switch SK is pressed, turn on the LEDs; when the starting switch SK is pressed again, turn off the LEDs and sleep the microcomputer process IC1.

The working principle of the present invention is as follows: the light emitting diodes LED1 to LED12 are wired in the LED lighting circuit for lighting up the dial, the level bubble and the pointer. The power circuit of the LED light-emitting flexible circuit board 7 supplies power to the LED lighting circuit through the microcomputer processor IC1 to light up the LEDs, allowing the pointer and the level bubble to give out light when the LEDs light up on the level bubble 3f in the pointer body 3a and the pointer head. The pointer 3 always points upward by its own gravity regardless of the tilt angle of the datum plane of the double-sided pointer type angle measuring device. When the turning angle of the double-sided pointer type angle measuring device of the invention is determined, the angle on the dial indicated by the pointer is the tilt angle of the angle measuring device.

The above mentioned examples are only preferred examples of the invention and not used to limit the invention. Any modification, equivalent replacement and improvement made within the range of the spirit and rule of the invention shall fall within the protection range of the invention.

What is claimed is:

1. A pointer type angle measuring device, comprising:
a shell (1) consisting of a front cover (1a) and a rear cover (1b), windows respectively arranged on the front cover (1a) and the rear cover (1b), a front transparent cover (4) and a rear transparent cover (4a) respectively arranged on the windows of the front cover (1a) and the rear cover (1b);
a pointer (3), arranged within an inner cavity of the shell (1) inside the front transparent cover (4) and the rear transparent cover (4a); a dial (2) of circular shape, fixed at the outer edge of the windows of the shell (1);
wherein the pointer (3) consists of a pointer body (3a), a front pointer head (3b) and a rear pointer head (3c); and the front pointer head (3b) is mounted directly on the pointer body (3a);
the front pointer head (3b) and the rear pointer head (3c) are made of transparent reflective material;
an LED lighting unit (6) is arranged within the inner cavity of the shell, and the LED lighting unit (6) comprises a circular LED fixing ring (6a) arranged at inside edge of the dial (2), an LED light-emitting flexible circuit board (7) is arranged on the LED fixing ring (6a), and multiple LEDs are arranged on the LED light-emitting flexible circuit board (7).

2. The pointer type angle measuring device of claim 1, wherein the dial (2) is arranged within the inner cavity of the shell (1) inside the front transparent cover (4) and the rear transparent cover (4a).

3. The pointer type angle measuring device of claim 2, characterized in that antiglare films (5) are respectively attached on the front transparent cover (4) and the rear transparent cover (4a).

4. The pointer type angle measuring device of claim 1, wherein the pointer body (3a) is of shell structure having an inner cavity; a level bubble (3f) is arranged in the inner cavity of the pointer body (3a), and level bubble windows (3g) are arranged in the front and rear of the pointer body (3a).

5. The pointer type angle measuring device of claim 4, wherein a through axle hole is arranged in the middle of the pointer body (3a), a bearing (3d) is installed within the axle hole, a main shaft (3e) is installed in a bearing hole of the bearing (3d), two ends of the main shaft (3e) are fixed to the front transparent cover (4) and the rear transparent cover (4a), and the pointer (3) can rotate around the main shaft (3e) as the axial line.

6. The pointer type angle measuring device of claim 1, wherein the LED light-emitting flexible circuit board (7) comprises a microcomputer processor IC1, a power circuit (7a), an alarm circuit (7b), a charging protective circuit (7c) and an LED drive circuit (7d); wherein:
the microcomputer processor IC1 is an HT46R064B microcomputer processor;
the power circuit (7a) comprises a capacitor C2, a capacitor C3, a parallel voltage stabilizing integrated circuit IC2, a resistor R4, a resistor R5 and a resistor R6; wherein, the capacitor C2 is an electrolytic capacitor, the cathode of the capacitor C2 is grounded and connected with pin 5 of the microcomputer processor IC1, one end of the capacitor C3, the anode of the parallel voltage stabilizing integrated circuit IC2, one end of the resistor R5 and one end of the resistor R6; the anode of the capacitor C2, pin 13 of the microcomputer processor IC1, pin 12 of the microcomputer processor IC1, the other end of the capacitor C3, the cathode of the parallel voltage stabilizing integrated circuit IC2, one end of the resistor R4 and one end of the resistor R6 are connected to the mains voltage VDD in the circuit; and the other end of the resistor R4, the other end of the resistor R5 and the reference electrode of the parallel voltage stabilizing integrated circuit IC2 are connected;

the alarm circuit (7b) comprises a buzzer BUZ, a resistor R9 and a triode Q2; wherein one end of the resistor R9 is connected with pin 15 of the microcomputer processor IC1, and the other end is connected with the base electrode of the triode Q2, pin 1 of the buzzer BUZ is connected with the mains voltage VDD, pin 2 of the buzzer BUZ is connected with the collector electrode of the triode Q2, and the emitter electrode of the triode Q2 is grounded; when the angle measuring device measures an angle, the microcomputer processor IC1 triggers PWM drive waveform, and through the resistor R9 to make triode Q2 drive the buzzer BUZ sound;

the charging protective circuit (7c) comprises a power source E, a resistor R2, a resistor R3, a resistor R8, a resistor R24, a resistor R25 and a triode Q1; wherein, the cathode of the power source E is connected with one end of the resistor R24 and grounded, the anode of the power source E is connected with one end of the resistor R8, one end of the resistor R25, the emitter electrode of the triode Q1 and the mains voltage VDD; the other end of the resistor R24 is connected with the other end of the resistor R25 and pin 4 of the microcomputer process IC1, the other end of the resistor R8 is connected with one end of the resistor R3, the collector electrode of the triode Q1 and the mains voltage VCC, the other end of the resistor R3 is connected with the base electrode of the triode Q1 and one end of the resistor R2, and the other end of the resistor R2 is connected with pin 7 of the microcomputer process IC1;

the LED drive circuit (7d) comprises a triode Q3, resistors R10 to R23, and light emitting diodes LED1 to LED12; wherein, one end of resistors R14 to R23 is respectively connected with the cathodes of light emitting diodes LED3 to LED12, the other ends of the resistors R14 to R23 are connected and grounded, and the anodes of light emitting diodes LED3 to LED12 are connected with the collector electrode of the triode Q3, the emitter electrode of the triode Q3 is connected with one end of the resistor R12, the anode of the light emitting diode LED1, the anode of the light emitting diode LED2 and the mains voltage VDD, the base electrode of the triode Q3 is connected with the other end of the resistor R12 and one end of the resistor R13, the other end of the resistor R13 is connected with pin 11 of the microcomputer process IC1, the cathode of the light emitting diode LED1 is connected with one end of the resistor R10, the other end of the resistor R10 is connected with pin 16 of the microcomputer process IC1, the cathode of the light emitting diode LED2 is connected with one end of the resistor R11, and the other end of the resistor R11 is connected with pin 1 of the microcomputer process IC1.

7. The pointer type angle measuring device of claim 6, wherein the LED light-emitting flexible circuit board (7) further comprises an energy-saving circuit (7e), and the energy-saving circuit (7e) comprises a capacitor C1, a capacitor C4, a resistor R1, a resistor R11 and a starting switch SK; wherein, the capacitor C1 is an electrolytic capacitor, the anode of the capacitor C1 is connected with one end of the resistor R11 and the mains voltage VCC in the circuit, the cathode of the capacitor C1 is grounded and connected with the other end of the resistor R11, one end of the capacitor C4 and one end of the resistor R1; the other end of the capacitor C4 is connected with one end of the starting switch SK and pin 7 of the microcomputer processor IC1, and the other end of the starting switch SK is connected with the other end of the resistor R1; when the starting switch SK is pressed, turn on the LEDs; when the starting switch SK is pressed again, turn off the LEDs and sleep the microcomputer process IC1.

* * * * *